US010452727B2

(12) United States Patent
Motgi et al.

(10) Patent No.: US 10,452,727 B2
(45) Date of Patent: Oct. 22, 2019

(54) METHOD AND SYSTEM FOR DYNAMICALLY PROVIDING CONTEXTUALLY RELEVANT NEWS BASED ON AN ARTICLE DISPLAYED ON A WEB PAGE

(75) Inventors: Amit Motgi, Santa Clara, CA (US); Ali Satter, San Jose, CA (US); Bruce Ng, Santa Clara, CA (US)

(73) Assignee: OATH INC., New York, NY (US)

(*) Notice: Subject to any disclaimer, the term of this patent is extended or adjusted under 35 U.S.C. 154(b) by 0 days.

(21) Appl. No.: 13/245,808

(22) Filed: Sep. 26, 2011

(65) Prior Publication Data

US 2013/0080453 A1    Mar. 28, 2013

(51) Int. Cl.
*G06F 16/953* (2019.01)
*G06F 16/9535* (2019.01)
*G06F 16/9536* (2019.01)

(52) U.S. Cl.
CPC ...... *G06F 16/9535* (2019.01); *G06F 16/9536* (2019.01)

(58) Field of Classification Search
CPC ........... G06F 17/30025; G06F 17/3005; G06F 17/30867; G06F 17/30905
See application file for complete search history.

(56) References Cited

U.S. PATENT DOCUMENTS

| 8,606,792 B1* | 12/2013 | Jackson | G06F 17/30699 707/748 |
| 10,068,022 B2* | 9/2018 | Pilpel | G06F 16/9024 |
| 2007/0150457 A1* | 6/2007 | Goldman | G06F 17/30716 |
| 2007/0300160 A1* | 12/2007 | Ferrel | H04L 67/02 715/744 |
| 2011/0252060 A1* | 10/2011 | Broman | G06F 16/957 707/771 |
| 2012/0159635 A1* | 6/2012 | He et al. | 726/26 |

(Continued)

OTHER PUBLICATIONS

Li et al., "User Comments for news recommendation in forum-based social media", Information Sciences, vol. 180, Issue 24, pp. 4929-4939, Dec. 15, 2010, Elsevier Inc., Available Online Sep. 3, 2010.*

(Continued)

*Primary Examiner* — Brittany N Allen
(74) *Attorney, Agent, or Firm* — James J. DeCarlo; Greenberg Traurig, LLP (57) ABSTRACT

A method and system for dynamically providing contextually relevant news on an article. The method includes extracting a list of key terms from the article on a web page. The method also includes filtering a set of posts associated with a key term in the list of key terms. The set of posts is also filtered from one of a plurality of user accounts and a plurality of editor programmed user accounts on one or more networking websites. The method further includes identifying a plurality of uniform resource locators comprised in the set of posts. Further, the method includes extracting the contextually relevant news from the plurality of uniform resource locators. The contextually relevant news is related to the key term. Moreover, the method includes displaying the contextually relevant news as news feed on the web page. The system includes electronic devices, a communication interface, a memory, and a processor.

16 Claims, 5 Drawing Sheets

(56) References Cited

U.S. PATENT DOCUMENTS

| | | | | |
|---|---|---|---|---|
| 2012/0290950 | A1* | 11/2012 | Rapaport | H04L 51/32 |
| | | | | 715/753 |
| 2013/0041893 | A1* | 2/2013 | Strike | 707/723 |
| 2013/0046771 | A1* | 2/2013 | Moitra | G06F 17/30705 |
| | | | | 707/749 |

OTHER PUBLICATIONS

Lee et al., "MONERS: A news recommender for the mobile web", Expert Systems with Applications 32, pp. 143-150, 2007, Elsevier Ltd.*

Messenger et al., "Recommendations Based on User-Generated Comments in Social Media", 2011 IEEE International Conference on Privacy, Security, Risk, and Trust, and IEEE International Conference on Social Computing, pp. 505-508, 2011, IEEE.*

Billsus et al., "Adaptive News Access", The Adaptive Web: LNCS 4321, pp. 550-570, 2007, Springer-Verlag Berlin Heidelberg.*

Cohen, "From Babel to Knowledge, Data Mining Large Digital Collections", D-Lib Magazine, vol. 12 No. 3, Mar. 2006.*

Goddard et al., "Linked Data Tools: Semantic Web for the Masses", First Monday, vol. 15, No. 11, Nov. 2010.*

* cited by examiner

METHOD AND SYSTEM FOR DYNAMICALLY PROVIDING CONTEXTUALLY RELEVANT NEWS BASED ON AN ARTICLE DISPLAYED ON A WEB PAGE

TECHNICAL FIELD

Embodiments of the disclosure relate to the field of dynamically providing contextually relevant news on an article.

BACKGROUND

Currently, a user reads or browses through an article on internet web page in brief since there is insufficient contextually relevant news on the web page to increase attention span of the user. Also, many relevant articles are inaccessible to the user. Hence, the user tends to search for other contextually relevant news outside a network, thereby leading to a loss in revenue for the network. Moreover, traffic recirculation in the network decreases if the user is unsatisfied with news content present on the network.

In the light of the foregoing discussion, there is a need for a method and system for an efficient technique to dynamically provide contextually relevant news on an article.

SUMMARY

The above-mentioned needs are met by a method, a computer program product and a system for dynamically providing contextually relevant news on an article.

An example of a method of dynamically providing contextually relevant news on an article includes extracting a list of key terms from the article on a web page. The method also includes filtering a set of posts associated with a key term in the list of key terms. The method further includes identifying a plurality of uniform resource locators comprised in the set of posts. Further, the method includes extracting the contextually relevant news from the plurality of uniform resource locators. The contextually relevant news is related to the key term. Moreover, the method includes displaying the contextually relevant news as news feed on the web page.

An example of a computer program product stored on a non-transitory computer-readable medium that when executed by a processor, performs a method of dynamically providing contextually relevant news on an article includes extracting a list of key terms from the article on a web page. The computer program product also includes filtering a set of posts associated with a key term in the list of key terms. The computer program product further includes identifying a plurality of uniform resource locators comprised in the set of posts. Further, the computer program product includes extracting the contextually relevant news from the plurality of uniform resource locators. The contextually relevant news is related to the key term. Moreover, the computer program product includes displaying the contextually relevant news as news feed on the web page.

An example of a system for dynamically providing contextually relevant news on an article includes one or more electronic devices. The system also includes a communication interface in electronic communication with the one or more electronic devices. The system further includes a memory that stores instructions. Further, the system includes a processor responsive to the instructions to extract a list of key terms from the article on a web page, to filter a set of posts associated with a key term in the list of key terms, to identify a plurality of uniform resource locators included in the set of posts, to extract the contextually relevant news from the plurality of uniform resource locators, and to display the contextually relevant news as news feed on the web page. The contextually relevant news is also related to the key term.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

FIG. 4 is an exemplary representation of a web page, in accordance with one embodiment; and FIG. 5 is an exemplary representation of a web page, in accordance with another embodiment.

DETAILED DESCRIPTION OF THE EMBODIMENTS

The above-mentioned needs are met by a method, computer program product and system for dynamically providing contextually relevant news on an article. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
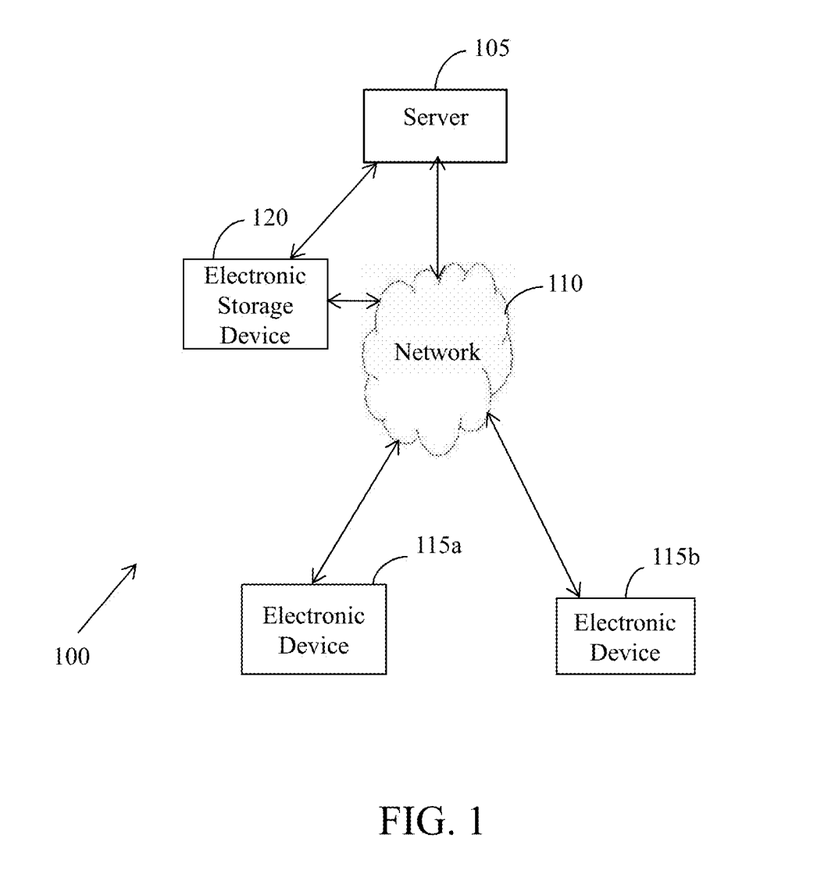
FIG. 1 is a block diagram of an environment, in accordance with which various embodiments can be implemented.

FIG. 1 is a block diagram of an environment 100, in accordance with which various embodiments can be implemented.

The environment 100 includes a server 105 connected to a network 110. The environment 100 further includes one or more electronic devices, for example an electronic device 115*a* and an electronic device 115*b*, which can communicate with each other through the network 110. Examples of the electronic devices include, but are not limited to, computers, mobile devices, laptops, palmtops, hand held devices, telecommunication devices, tablet personal computers, and personal digital assistants (PDAs).

The electronic devices can communicate with the server 105 through the network 110. Examples of the network 110 include, but are not limited to, a Local Area Network (LAN), a Wireless Local Area Network (WLAN), a Wide Area Network (WAN), internet, a Small Area Network (SAN), and a cellular network. The electronic devices associated with different users can be remotely located with respect to the server 105.

The server 105 is also connected to an electronic storage device 120 directly or via the network 110 to store information, for example a list of key terms, a set of posts, and contextually relevant news.

In some embodiments, different electronic storage devices are used for storing the information.

A user of an electronic device, for example the electronic device 115a, can view an article on a web page. In one example, the contextually relevant news that is extracted from uniform resource locators (URLs), included in a set of posts, is displayed along with the article on the web page. In another example, the set of posts filtered from a plurality of editor programmed user accounts on a networking website is displayed along with the article on the web page. The user can provide a response to one or more posts in the set of posts. The server 105, for example a Yahoo!® server, is used to extract the list of key terms from the article, filter the set of posts associated with a key term from one or more networking websites, identify the URLs in the set of posts, extract the contextually relevant news from the URLs, and display the contextually relevant news as news feed on the web page. The electronic storage device 120 can store the list of key terms, the set of posts, and the contextually relevant news.

Figure 2:
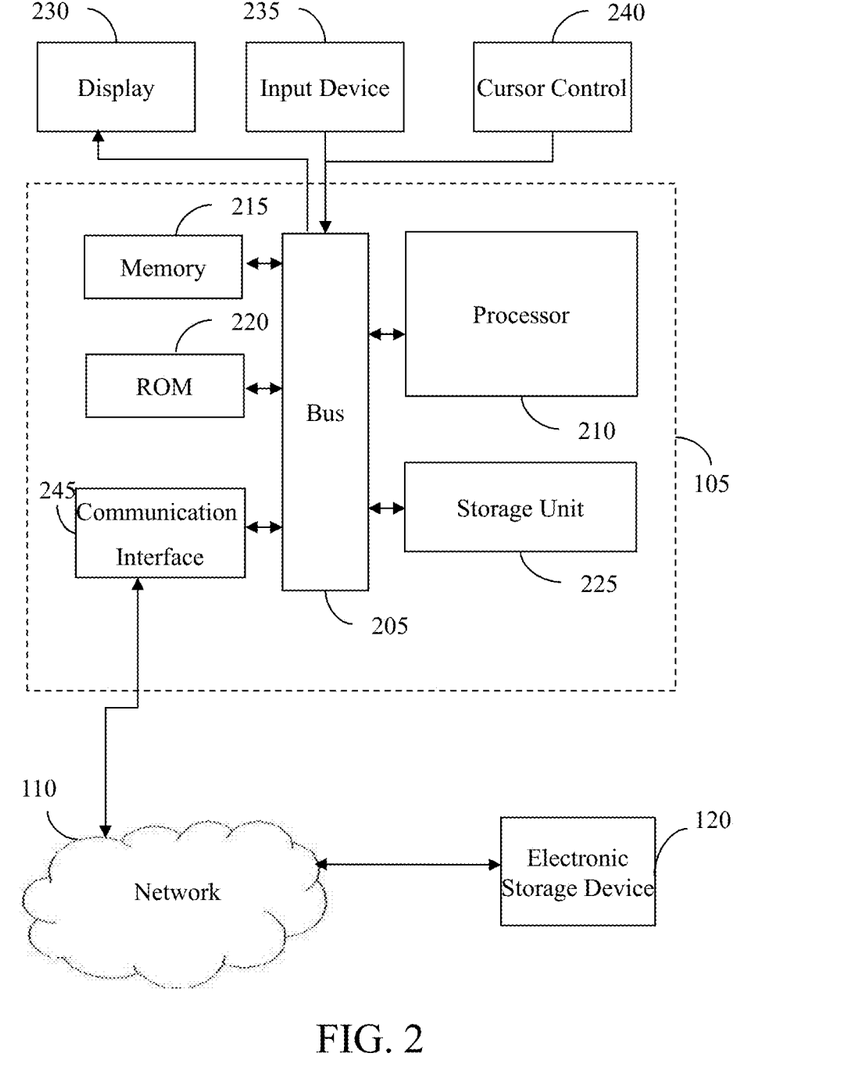
FIG. 2 is a block diagram of a server, in accordance with one embodiment.

The server 105 including a plurality of elements is explained in detail in conjunction with FIG. 2.

FIG. 2 is a block diagram of the server 105, in accordance with one embodiment.

The server 105 includes a bus 205 or other communication mechanism for communicating information, and a processor 210 coupled with the bus 205 for processing information. The server 105 also includes a memory 215, for example a random access memory (RAM) or other dynamic storage device, coupled to the bus 205 for storing information and instructions to be executed by the processor 210. The memory 215 can be used for storing temporary variables or other intermediate information during execution of instructions by the processor 210. The server 105 further includes a read only memory (ROM) 220 or other static storage device coupled to the bus 205 for storing static information and instructions for the processor 210. A storage unit 225, for example a magnetic disk or optical disk, is provided and coupled to the bus 205 for storing information, for example the list of key terms, the set of posts, and the contextually relevant news.

The server 105 can be coupled via the bus 205 to a display 230, for example a cathode ray tube (CRT), and liquid crystal display (LCD) for displaying the contextually relevant news to the user. An input device 235, including alphanumeric and other keys, is coupled to bus 205 for communicating information and command selections to the processor 210. Another type of user input device is a cursor control 240, for example a mouse, a trackball, or cursor direction keys for communicating direction information and command selections to the processor 210 and for controlling cursor movement on the display 230. The input device 235 can also be included in the display 230, for example a touch screen.

Various embodiments are related to the use of the server 105 for implementing the techniques described herein. In some embodiments, the techniques are performed by the server 105 in response to the processor 210 executing instructions included in the memory 215. Such instructions can be read into the memory 215 from another machine-readable medium, for example the storage unit 225. Execution of the instructions included in the memory 215 causes the processor 210 to perform the process steps described herein.

In some embodiments, the processor 210 can include one or more processing units for performing one or more functions of the processor 210. The processing units are hardware circuitry used in place of or in combination with software instructions to perform specified functions.

The term "machine-readable medium" as used herein refers to any medium that participates in providing data that causes a machine to perform a specific function. In an embodiment implemented using the server 105, various machine-readable media are involved, for example, in providing instructions to the processor 210 for execution. The machine-readable medium can be a storage medium, either volatile or non-volatile. A volatile medium includes, for example, dynamic memory, such as the memory 215. A non-volatile medium includes, for example, optical or magnetic disks, for example the storage unit 225. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic media, a CD-ROM, any other optical media, punch-cards, paper-tape, any other physical media with patterns of holes, a RAM, a PROM, and EPROM, a FLASH-EPROM, any other memory chip or cartridge.

In another embodiment, the machine-readable media can be transmission media including coaxial cables, copper wire and fiber optics, including the wires that comprise the bus 205. Transmission media can also take the form of acoustic or light waves, such as those generated during radio-wave and infra-red data communications. Examples of machine-readable media may include, but are not limited to, a carrier wave as described hereinafter or any other media from which the server 105 can read, for example online software, download links, installation links, and online links. For example, the instructions can initially be carried on a magnetic disk of a remote computer. The remote computer can load the instructions into its dynamic memory and send the instructions over a telephone line using a modem. A modem local to the server 105 can receive the data on the telephone line and use an infra-red transmitter to convert the data to an infra-red signal. An infra-red detector can receive the data carried in the infra-red signal and appropriate circuitry can place the data on the bus 205. The bus 205 carries the data to the memory 215, from which the processor 210 retrieves and executes the instructions. The instructions received by the memory 215 can optionally be stored on the storage unit 225 either before or after execution by the processor 210. All such media must be tangible to enable the instructions carried by the media to be detected by a physical mechanism that reads the instructions into a machine.

The server 105 also includes a communication interface 245 coupled to the bus 205. The communication interface 245 provides a two-way data communication coupling to the network 110. For example, the communication interface 245 can be an integrated services digital network (ISDN) card or a modem to provide a data communication connection to a corresponding type of telephone line. As another example, the communication interface 245 can be a local area network (LAN) card to provide a data communication connection to a compatible LAN. Wireless links can also be implemented. In any such implementation, the communication interface 245 sends and receives electrical, electromagnetic or optical signals that carry digital data streams representing various types of information.

The server 105 is also connected to the electronic storage device 120 to store the list of key terms, the set of posts, and the contextually relevant news.

The processor 210 in the server 105, for example a Yahoo!® server, extracts the list of key terms from the article on the web page. The processor 210 filters a set of posts associated with a key term in the list of key terms. The processor 210 further identifies URLs in the set of posts. The processor 210 then extracts the contextually relevant news from the URLs and subsequently enables display of the contextually relevant news as news feed on the web page. The processor 210 also displays the set of posts, filtered from editor programmed user accounts, as the news feed on the web page. The user can then provide a response to one or more posts in the set of posts.

Figure 3:
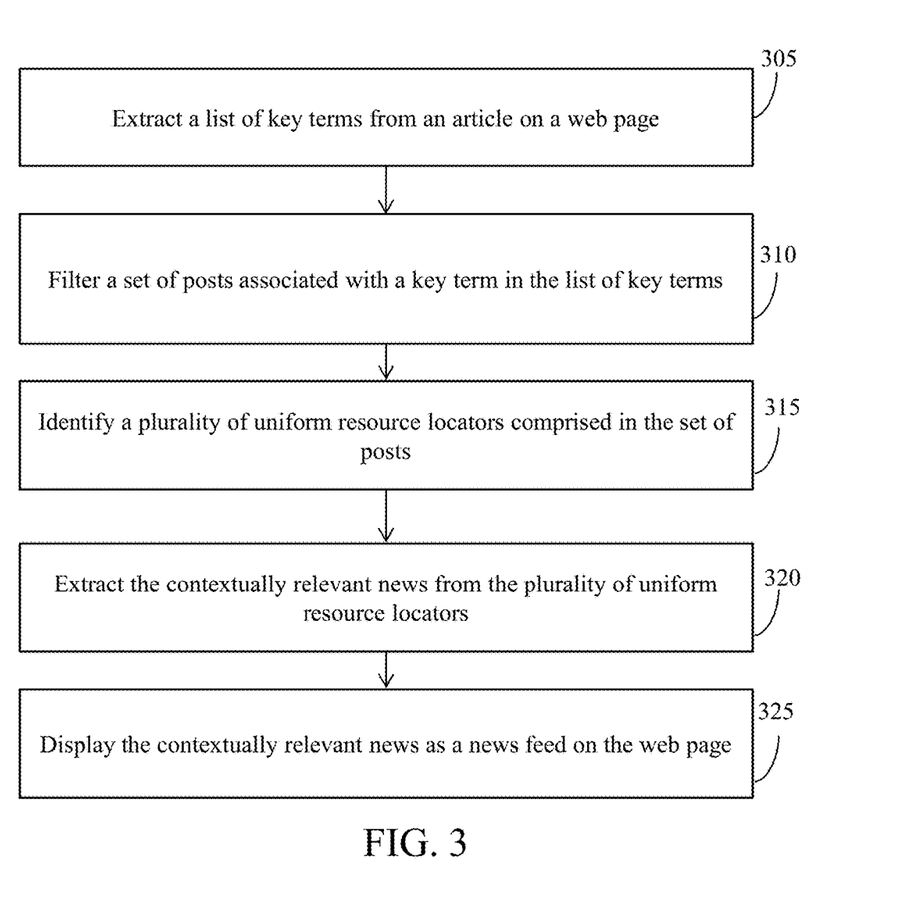
FIG. 3 is a flowchart illustrating a method of dynamically providing contextually relevant news on an article, in accordance with one embodiment.

FIG. 3 is a flowchart illustrating a method of dynamically providing contextually relevant news on an article, in accordance with one embodiment. Posts can be defined as messages posted on a website in association with a topic of conversation. Key terms are words or phrases in the article that are important in defining the article.

In one example, the method is performed using a server, for example the server 105, or using an application that is downloadable and resides on an electronic device, for example the electronic device 115a.

At step 305, a list of key terms is extracted from the article on a web page. The article is analyzed and the list of key terms is extracted from the article by the server, for example the server 105, when a user of an electronic device, for example the electronic device 115a, visits the web page to view the article.

In some embodiments, the list of key terms can be extracted using a term extraction application programming interface (API), for example Yahoo!® Term Extraction API, through a query language, for example Yahoo!® Query Language (YQL).

The list of key terms can be stored at the server or an electronic storage device, for example the electronic storage device 120. In one example, the server can be a centralized server or a distributed server of Yahoo!®.

At step 310, a set of posts associated with a key term in the list of key terms are filtered.

The key term in the list of key terms is identified and a search is subsequently performed for the set of posts associated with the key term. The set of posts can be filtered from one or more networking websites.

In some embodiments, the set of posts can be filtered from a plurality of user accounts on a networking website or a plurality of editor programmed user accounts on the networking website. The user accounts are pre-defined user accounts that can be algorithmically generated. The editor programmed user accounts are pre-defined user accounts on the networking website that are selected by editors, for example editors of Yahoo!®.

In some embodiments, each post in the set of posts can include textual conversation between a plurality of users, uniform resource locators (URLs), or a combination of both.

In some embodiments, the set of live posts associated with the key term can be filtered from the networking websites using a search algorithm.

At step 315, a plurality of URLs included in the set of posts is identified. The URLs can include specific URLs or nonspecific URLs.

In one example, specific URLs, for example Yahoo!® URLs, can be identified in the set of posts. In another example, nonspecific URLs can be identified in the set of posts.

At step 320, the contextually relevant news is extracted from the URLs. The contextually relevant news is related to the key term. The contextually relevant news includes at least one of title, image, audio, video, and article content. The contextually relevant news is extracted from other websites, for example Yahoo!® websites, via the URLs.

At step 325, the contextually relevant news is displayed as news feed on the web page. Hence, when the user of the electronic device visits the web page to view the article, the user can also view the contextually relevant news as the news feed on the web page itself.

In some embodiments, the list of key terms and the set of posts are displayed in extensible markup language (XML) format, in hypertext markup language (HTML) format, or in JavaScript Object Notation (JSON) format.

In some embodiments, the user can provide a response to one or more posts in the set of posts. Examples of the response include, but are not limited to, a reply to a post, and adding the post as a preferred post on the web page. The reply can be posted to at least one of the web page and the networking website.

In one example, on outbreak of Japan's Tsunami, users on Twitter were tweeting URLs to related images, videos and articles. The method hence the application would pull relevant tweets, extract content from the tweeted URLs and create a newspaper like view right on the article pages about the tsunami.

In some embodiments, the list of key terms is extracted from the article on the web page and the set of posts is filtered from the editor programmed user accounts on the networking website. The editor programmed user accounts are selected based on quality of content that is posted. Users of the editor programmed user accounts can either sell the set of posts to a web publisher, for example Yahoo!®, or the web publisher can hire the users of the editor programmed user accounts. The set of posts along with user names of the editor programmed user accounts are then directly displayed as the news feed on the web page. The user can choose one of the user names of the editor programmed user accounts to update the news feed with a relevant set of posts. The user can further provide the response to the one or more posts in the set of posts.

FIG. 4 is an exemplary representation of a web page 405, in accordance with one embodiment. A user visits the web page 405 on Yahoo!® News to read a news article that discusses a former Google CEO. A server, for example the Yahoo!® server, extracts a list of key terms, for example ceo eric schmidt and internal memos, from the news article that are relevant. The server also filters a set of posts, for example contextual relevant tweets, associated with a key term, for example ceo eric schmidt, in the list of key terms. The set of posts can be filtered from one or more networking websites, for example Twitter. The set of posts is further filtered from one of a plurality of user accounts on the networking website and a plurality of editor programmed user accounts on the networking website. One or more posts in the first set of live posts can include textual conversation regarding Eric Schmidt, Yahoo!® URLs, or a combination of both. The Yahoo!® URLs in the set of posts are then identified. The contextually relevant news from the Yahoo!® URLs is subsequently extracted and displayed as news feed 410 on the web page 405. The user can then view the news feed along with the news article. The user can also reply to a post or can add the post as a preferred post. The reply can be posted to at least one of the web page 405 and the networking website.

FIG. 5 is an exemplary representation of a web page 505, in accordance with another embodiment. A user visits the web page 505 on Yahoo!® News to read a news article that discusses a former Google CEO. A server, for example the Yahoo!® server, extracts a list of key terms, for example ceo eric schmidt and internal memos, from the news article that are relevant. The server also filters out a set of posts, for example contextual relevant tweets, associated with a key term, for example ceo eric schmidt, in the list of key terms. The set of posts can be filtered from one or more networking websites, for example Twitter. The set of posts is further filtered from a plurality of editor programmed user accounts on the networking website. One or more posts in the set of posts can include textual conversation regarding Eric Schmidt, Yahoo!® URLs, or a combination of both. The set of posts along with user names, for example Alice, Bob, and Charles, of the editor programmed user accounts are then directly displayed as news feed 510 on the web page 505. The user can choose one of the user names, for example Alice, of the editor programmed user accounts. The user can then view an updated news feed with a relevant set of posts of Alice. The user can further provide the response to the one or more posts in the set of posts.

The present disclosure dynamically provides contextually relevant news on an article by extracting contextually relevant news from URLs in a set of posts based on a list of key terms extracted from the article. On the web page, the user can directly view the contextually relevant news related to a key term. The present disclosure also provides contextually relevant news on the article by directly displaying, on the web page, the set of posts filtered from editor programmed user accounts in a networking website. The present disclosure hence provides a contextually relevant and engaging experience to the user as the user is able to follow the contextually relevant news on the web page that includes the article. Further, traffic can recirculate within a network, for example the Yahoo!® network, by filtering the live posts based on specific URLs, for example Yahoo!® URLs. Revenue can also be increased due to increased engagement, increased page views due to traffic recirculation through the URLs, and increased time spent on the web page.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A method comprising:
   identifying, via a computing device, an article displayed on a web page comprising digital information;
   analyzing, via the computing device, the information comprised within said article, and based on said analysis, determining a context of the article;
   extracting, via the computing device, a list of key terms from the article based on said context, said extraction comprising executing a term extraction application programming interface (API) to analyze said article and extract each of the key terms from the article on the web page;
   identifying, via the computing device, a plurality of editor programmed user accounts on a networking website;
   selecting, via the computing device, a set of editor programmed user accounts based on a quality of content posted by each identified account;
   searching, via the computing device, each selected account based on said extracted key terms, and based on said searching, identifying a set of live posts comprising content corresponding to said determined context of the article;
   filtering, via the computing device, said identified set of live posts based on an extracted key term used to identify a respective live post within said set of live posts;
   identifying, via the computing device, a plurality of uniform resource locators comprised in the content of the set of live posts, each of said plurality of uniform resource locators pointing to a location on a network comprising contextually relevant news content to said extracted key term, said news content comprising digital content associated with said context;
   identifying, via the computing device, said news content on said network associated with each of the uniform resource locators;
   extracting, via the computing device, the news content from each respective network location;
   generating, via the computing device, a news feed comprising said news content; and communicating, via the computing device, the news feed for display on the web page that is displaying said article, said communication of the news feed causing the web page to be modified to display the news feed.

2. The method as claimed in claim 1, wherein the set of posts filtered from the plurality of editor programmed user accounts is directly displayed as the news feed on the web page.

3. The method as claimed in claim 1, wherein the uniform resource locators comprises specific uniform resource locators and nonspecific uniform resource locators.

4. The method as claimed in claim 1, further comprising enabling a user to provide a response to one or more posts of the set of posts, wherein the response comprises adding the post as a preferred post.

5. The method as claimed in claim 1, wherein the list of key terms is extracted from the article using the term extraction application programming interface through a query language.

6. A non-transitory computer-readable storage medium tangibly encoded with computer-executable code, that when executed by a processor associated with a computing device, performs a method comprising:
   identifying an article displayed on a web page comprising digital information;
   analyzing the information comprised within said article, and based on said analysis, determining a context of the article;
   extracting a list of key terms from the article based on said context, said extraction comprising executing a term extraction application programming interface (API) to analyze said article and extract each of the key terms from the article on the web page;
   identifying a plurality of editor programmed user accounts on a networking website;
   selecting a set of editor programmed user accounts based on a quality of content posted by each identified account;
   searching each selected account based on said extracted key terms, and based on said searching, identifying a set of live posts comprising content corresponding to said determined context of the article;
   filtering said identified set of live posts based on an extracted key term used to identify a respective live post within said set of live posts;
   identifying a plurality of uniform resource locators comprised in the content of the set of live posts, each of said plurality of uniform resource locators pointing to a location on a network comprising contextually relevant news content to said extracted key term, said news content comprising digital content associated with said context;
   identifying said news content on said network associated with each of the uniform resource locators;
   extracting the news content from each respective network location;
   generating a news feed comprising said news content; and
   communicating the news feed for display on the web page that is displaying said article, said communication of the news feed causing the web page to be modified to display the news feed.

7. The non-transitory computer-readable storage medium as claimed in claim 6, wherein the set of posts filtered from the plurality of editor programmed user accounts is directly displayed as the news feed on the web page.

8. The non-transitory computer-readable storage medium as claimed in claim 6, wherein the uniform resource locators comprises specific uniform resource locators and nonspecific uniform resource locators.

9. The non-transitory computer-readable storage medium as claimed in claim 6, further comprising enabling a user to provide a response to one or more posts of the set of posts, wherein the response comprises adding the post as a preferred post.

10. The non-transitory computer-readable storage medium as claimed in claim 6, wherein the list of key terms is extracted from the article using the term extraction application programming interface through a query language.

11. A computing device comprising:
   a processor;
   a non-transitory computer-readable storage medium for tangibly storing thereon program logic for execution by the processor, the program logic comprising:
      logic executed by the processor for identifying an article displayed on a web page comprising digital information;
      logic executed by the processor for analyzing the information comprised within said article, and based on said analysis, determining a context of the article;
      logic executed by the processor for extracting a list of key terms from the article based on said context, said extraction comprising executing a term extraction application programming interface (API) to analyze said article and extract each of the key terms from the article on the web page;
      logic executed by the processor for identifying a plurality of editor programmed user accounts on a networking website;
      logic executed by the processor for selecting a set of editor programmed user accounts based on a quality of content posted by each identified account;
      logic executed by the processor for searching each selected account based on said extracted key terms, and based on said searching, identifying a set of live posts comprising content corresponding to said determined context of the article;
      logic executed by the processor for filtering said identified set of live posts based on an extracted key term used to identify a respective live post within said set of live posts;
      logic executed by the processor for identifying a plurality of uniform resource locators comprised in the content of the set of live posts, each of said plurality of uniform resource locators pointing to a location on a network comprising contextually relevant news content to said extracted key term, said news content comprising digital content associated with said context;
      logic executed by the processor for identifying said news content on said network associated with each of the uniform resource locators;
      logic executed by the processor for extracting the news content from each respective network location;
      logic executed by the processor for generating a news feed comprising said news content; and
      logic executed by the processor for communicating the news feed for display on the web page that is displaying said article, said communication of the news feed causing the web page to be modified to display the news feed.

12. The computing device as claimed in claim 11, further comprising:

logic executed by the processor for communicating, for display, the set of posts, filtered from a plurality of editor programmed user accounts, as the news feed on the web page.

13. The computing device as claimed in claim 11, further comprising:
logic executed by the processor for storing the list of key terms, the set of posts, and the contextually relevant news.

14. The computing device as claimed in claim 1, further comprising recirculating traffic within a network by filtering live posts based on specific URLs.

15. The non-transitory computer-readable storage medium as claimed in claim 6, further comprising recirculating traffic within a network by filtering live posts based on specific URLs.

16. The computing device as claimed in claim 11, further comprising:
communication logic executed by the processor for recirculating traffic within a network by filtering live posts based on specific URLs.

* * * * *